(12) United States Patent
Jankowski et al.

(10) Patent No.: US 7,703,978 B2
(45) Date of Patent: Apr. 27, 2010

(54) TEMPERATURE MEASURING DEVICE

(75) Inventors: Tilo Jankowski, Berlin (DE); Rainer Kuepper, Berlin (DE)

(73) Assignee: Raytek GmbH, Berlin (DE)

( * ) Notice: Subject to any disclaimer, the term of this patent is extended or adjusted under 35 U.S.C. 154(b) by 85 days.

(21) Appl. No.: 11/826,689

(22) Filed: Jul. 17, 2007

(65) Prior Publication Data

US 2008/0187023 A1 Aug. 7, 2008

(30) Foreign Application Priority Data

Feb. 6, 2007 (DE) .................. 20 2007 001 719 U

(51) Int. Cl.
*G01K 1/00* (2006.01)
*G01K 7/00* (2006.01)

(52) U.S. Cl. ...................................... 374/208; 374/163

(58) Field of Classification Search .................. 374/208, 374/163

See application file for complete search history.

(56) References Cited

U.S. PATENT DOCUMENTS

| 4,743,122 | A | * | 5/1988 | Yamano et al. | ............. 374/208 |
| 7,441,950 | B2 | * | 10/2008 | Kamiyama et al. | .......... 374/185 |
| 2005/0083991 | A1 | * | 4/2005 | Wong | ......................... 374/131 |

* cited by examiner

*Primary Examiner*—Gail Verbitsky
*Assistant Examiner*—Mirellys Jagan
(74) *Attorney, Agent, or Firm*—Nixon & Vanderhye PC

(57) ABSTRACT

A temperature measuring device includes a temperature sensor and at least two printed circuit boards connected together and extending transversely to one another for establishing an electrical connection between the temperature sensor and a connecting cable.

16 Claims, 2 Drawing Sheets

TEMPERATURE MEASURING DEVICE

BACKGROUND

1. Technical Field

The present invention relates to a temperature measuring device, in particular, a temperature measuring device with an infrared measuring head for the non-contact measuring of temperatures.

2. Related Art

In the non-contact measuring of the temperature of an object, the heat radiation emitted by the object is detected by a detector, converted into an electrical signal and supplied over a cable to an evaluating unit. It can happen that during rapid changes of the ambient temperature, the cable registers these temperature gradients in the temperature measuring head and a undesired heat flow occurs from the cable to the detector located in the temperature measuring head. This undesired heat input leads to measuring errors when there are large gradients in the ambient temperature.

From the state of the art it is already known to arrange a circuit board between the detector and the connecting cable parallel to the detector and to configure the conductor pathways in a meandering structure on the board in order to obtain an extended conduction path or a larger surface on which more heat can be emitted to the environment by means of heat transfer whereby the risk of measuring errors is to be reduced.

The disadvantage of such embodiments is that only a narrow restricted space is available for applying such meandering structures and that a satisfactory discharge of heat cannot be realized. This has an effect, among other things, on the measuring function of the detector with strong temperature fluctuations of the ambient temperature.

BRIEF SUMMARY

An object of the invention is the reduction of the heat input of the conductors, preferably with simultaneously constant, low inductance electrical contacting.

This object is solved by the invention recited in claim 1. Advantageous embodiments are recited by the sub-claims.

In accordance with the exemplary embodiment, there is provided a temperature measuring device comprising a temperature sensor; and at least two printed circuit boards connected together and extending transversely to one another, for establishing an electrical connection between said temperature sensor and a connecting cable.

By means of the two printed circuit boards connected to each other and extending transversely to each other, a larger surface is available on which, in a preferred embodiment of the invention, electrical conductors in meandering form are provided to establish the electrical connection between the temperature sensor and the connection cable. The individual conductors in meandering form can be electrically connected with one another.

By means of the meandering pattern of the connecting conductors, an improved heat transmission results since an extended conductive path is created by this structure and thereby more heat can be dissipated by the printed circuit board material as well as the surrounding air. As a result of this, the measuring device is less sensitive to strong fluctuations in the ambient temperature.

Printed circuit boards extending "transversely" to each other are generally understood to be printed circuit boards which do not extend parallel to each other. In a preferred embodiment, the circuit boards, however, extend perpendicular to each other. In particular, the two circuit boards can cross each other along their respective center axes. Furthermore, the circuit boards can be arranged such that their longitudinal axes extend perpendicular to the temperature sensor. By providing the two circuit boards such that they cross each other and are arranged perpendicularly to the position of the detector, a greater surface is created for applying the meandering structure which additionally enhances the thermal transmission.

Preferably, a plurality of strands extend from the terminal cable, wherein a meandering line connects to each strand. On the basis of the design of the printed circuit boards according to the invention, a meandering-like structure can be arranged on each side of each circuit board which is in connection with a single stranded wire so that the heat input of the cable is distributed on at least four surfaces.

In a preferred embodiment of the invention, the meandering structure of the respective connecting conductor extends across the entire length and/or width of a printed circuit board side. This has the advantage of a further lengthening of the heat conduction. According to a further embodiment, the conductors can be applied also only across the entire length of the printed circuit board or be arranged such that they are applied around mounted components on the printed board and thereby utilize the entire free surface.

BRIEF DESCRIPTION OF THE DRAWINGS

The present invention will be explained hereafter in an exemplary embodiment on the basis of the attached drawings. In the drawings.

DETAILED DESCRIPTION OF EXEMPLARY EMBODIMENTS

Figure 1:
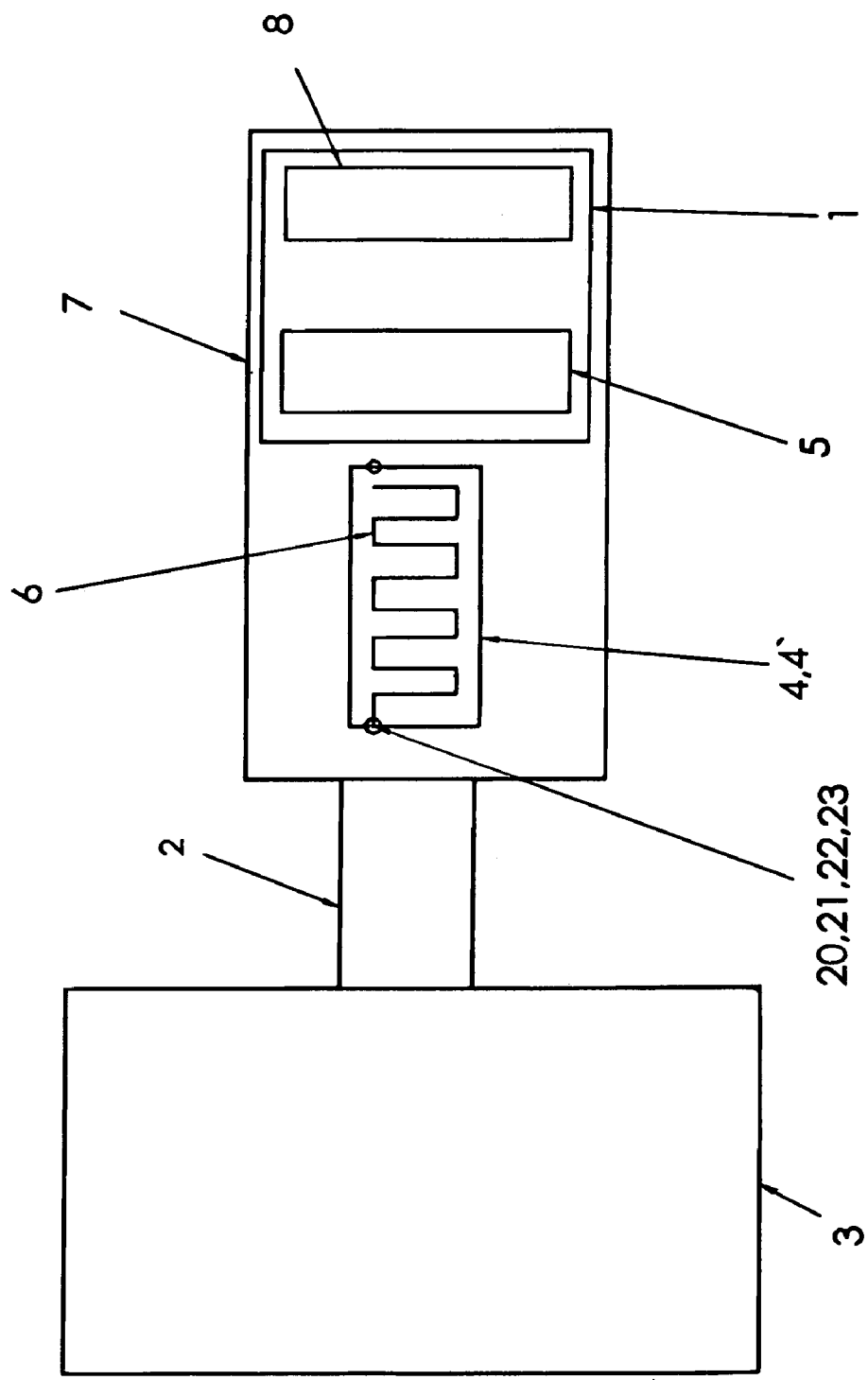
FIG. 1: A schematic representation of the arrangement of the individual parts of a temperature measuring device according to an embodiment of the invention.

FIG. 1 shows a sensor head designated as 7 with its main components. The sensor head comprises an optical tube 1, in which a detector 5 for detecting incoming heat radiation as well as an optical lens 8 are arranged. This detector 5 is connected with two printed circuit boards 4, 4', which are arranged perpendicular to said detector and tucked together so that they cross each other. On these printed circuit boards, electrical conductors 6 are arranged in the form of meandering structures which proceed from four strands 20, 21, 22, 23 (not shown here) on the one side and are connected to the detector on the other side. These four strands are components of cable 2. Cable 2 transmits an electrical signal to an evaluating unit 3. When cable 2 heats up due to a sudden change in the ambient temperature, a transmission of heat takes place over the four stranded wires (not shown) and the electrical conductor 6 connected thereto. In a conventional construction with only one printed circuit board, this heat would be transferred via the conductors to the detector and measuring errors would thereby ensue as a consequence. In the present invention, however, an extended conduction path is created by the meandering structure of the electrical conductors 6 and the crossed and tilted construction of the printed circuit boards 4, 4' so that the heat by means of thermal transfer is emitted via the material of the printed circuit boards and the air surrounding the printed circuit boards and in this way a heat discharge takes place. In addition, the electrical conductors 6 are designed particularly thin, thereby to further reduce heat transmission.

Figure 2:
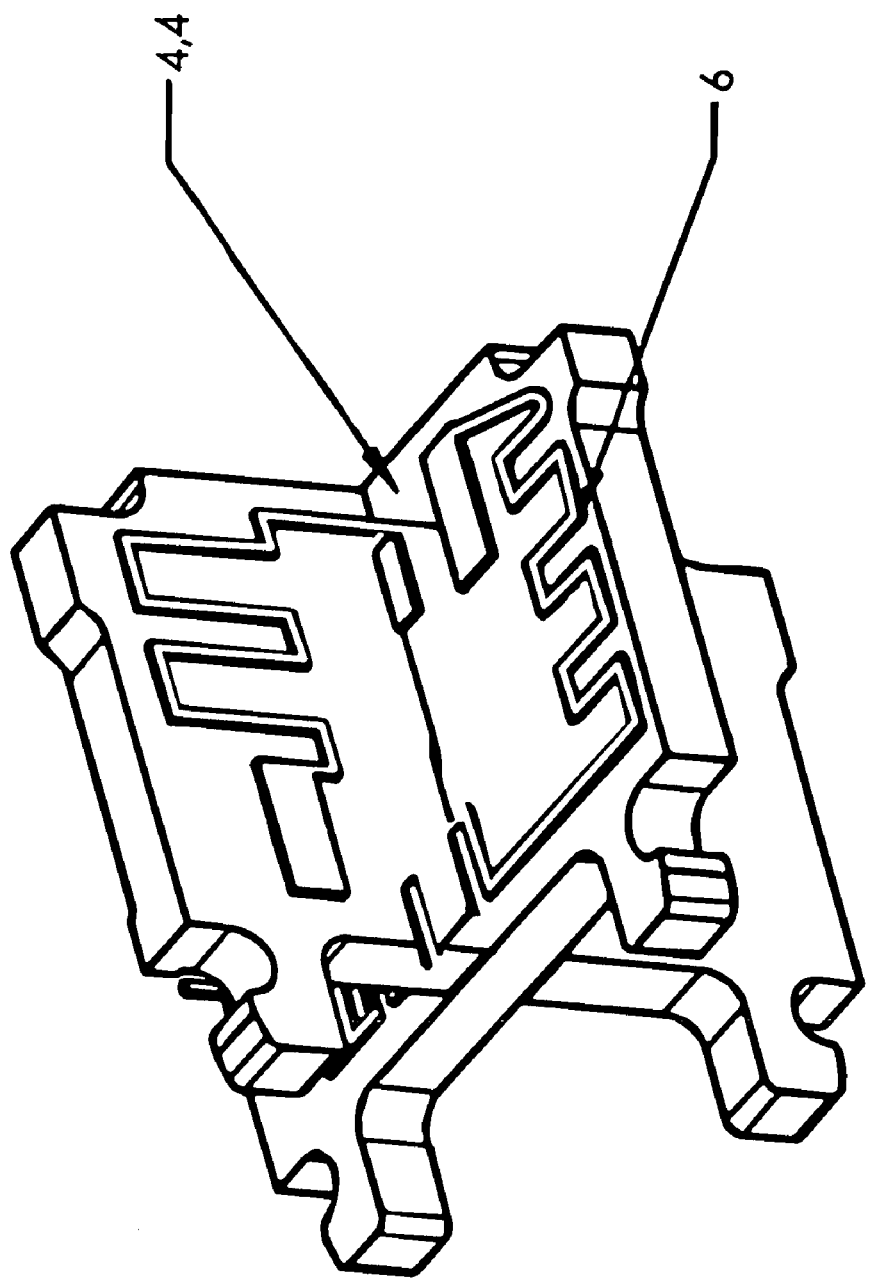
FIG. 2: the arrangement of printed circuit boards according to an embodiment of the invention.

FIG. 2 illustrates in particular the connection between the cable components, the printed circuit boards and the meandering structures. The strands 20, 21, 22, 23 are respectively connected to one side of a printed circuit board 4, 4'. An electrical conductor 6 which has a meandering form extends from these, respectively. On the other end, this electrical conductor is connected with the detector 5 (not shown).

LIST OF REFERENCE NUMBERS

| | |
|---|---|
| 1 | Optical barrel |
| 2 | Cable |
| 3 | Evaluating unit |
| 4, 4' | Printed circuit boards |
| 5 | Detector |
| 6 | Meandering form |
| 7 | Sensor head |
| 8 | Optical lens |
| 20, 21, 22, 23 | Strands |

What is claimed is:

1. A temperature measuring device, said device comprising:
   a temperature sensor; and
   at least two printed circuit boards connected together and extending transversely to one another, for establishing an electrical connection between said temperature sensor and a connecting cable;
   wherein the longitudinal axes of said two printed circuit boards extend perpendicularly to said temperature sensor.

2. The temperature measuring device according to claim 1, wherein said two printed circuit boards cross each other along their respective center axes.

3. The temperature measuring device according to claim 2, wherein said two printed circuit boards respectively comprise one or more electrical conductors for establishing the electrical connection between said temperature sensor and said connecting cable, and wherein said electrical conductors extend in meandering form on said respective printed circuit boards.

4. The temperature measuring device according to claim 1, wherein said two printed circuit boards extend perpendicularly to each other.

5. The temperature measuring device according to claim 4, wherein said two printed circuit boards respectively comprise one or more electrical conductors for establishing the electrical connection between said temperature sensor and said connecting cable, and wherein said electrical conductors extend in meandering form on said respective printed circuit boards.

6. The temperature measuring device according to claim 4, wherein said two printed circuit boards cross each other along their respective center axes.

7. The temperature measuring device according to claim 6, wherein said two printed circuit boards respectively comprise one or more electrical conductors for establishing the electrical connection between said temperature sensor and said connecting cable, and wherein said electrical conductors extend in meandering form on said respective printed circuit boards.

8. The temperature measuring device according to claim 7, wherein a plurality of strands extends from said connecting cable, and each strand is connected to a conductor having meandering form.

9. A temperature measuring device, said device comprising:
   a temperature sensor; and
   at least two printed circuit boards connected together and extending transversely to one another, for establishing an electrical connection between said temperature sensor and a connecting cable;
   wherein said two printed circuit boards respectively comprise one or more electrical conductors for establishing the electrical connection between said temperature sensor and said connecting cable, and wherein said electrical conductors extend in meandering form on said respective printed circuit boards.

10. The temperature measuring device according to claim 9, wherein said conductors having a meandering form extend substantially over the entire length and/or width of said respective printed circuit board.

11. The temperature measuring device according to claim 9, wherein said two printed circuit boards extend perpendicularly to each other.

12. The temperature measuring device according to claim 9, wherein said two printed circuit boards cross each other along their respective center axes.

13. The temperature measuring device according to claim 9, wherein a plurality of strands extends from said connecting cable, and each strand is connected to a conductor having meandering form.

14. The temperature measuring device according to claim 13, wherein said conductors having a meandering form extend substantially over the entire length and/or width of said respective printed circuit board.

15. The temperature measuring device according to claim 9, wherein the longitudinal axes of said two printed circuit boards extend perpendicularly to said temperature sensor.

16. The temperature measuring device according to claim 15, wherein a plurality of strands extends from said connecting cable, and each strand is connected to a conductor having meandering form.

* * * * *